(12) United States Patent  
Ding

(10) Patent No.: US 7,158,636 B2
(45) Date of Patent: Jan. 2, 2007

(54) MULTIVARIABLE CRYPTOSYSTEM

(75) Inventor: Jintai Ding, 8189 Margaret La., Cincinnati, OH (US) 45242

(73) Assignee: Jintai Ding, Cincinnati, OH (US)

( * ) Notice: Subject to any disclaimer, the term of this patent is extended or adjusted under 35 U.S.C. 154(b) by 704 days.

(21) Appl. No.: 10/412,540

(22) Filed: Apr. 11, 2003

(65) Prior Publication Data

US 2003/0215093 A1 Nov. 20, 2003

Related U.S. Application Data

(60) Provisional application No. 60/371,962, filed on Apr. 11, 2002.

(51) Int. Cl.
*H04K 1/00* (2006.01)
*H04L 9/00* (2006.01)

(52) U.S. Cl. .............................. 380/30; 380/28; 380/37
(58) Field of Classification Search .................... None
See application file for complete search history.

(56) References Cited

U.S. PATENT DOCUMENTS 4,405,829 A 9/1983 Rivest et al.
5,740,250 A 4/1998 Moh

OTHER PUBLICATIONS

Louis Goubin and Nicolas T. Courtois, *Cryptanalysis of the TTM Cryptosystem*, vol. 1976, pp. 0044, Lecture Notes in Computer Science.
Nicolas T. Courtois and Jacques Patarin, *The Security of Hidden Field Equations (HFE)*, CT-RSA 2001, LNCS 2020, pp. 266-281, Lecture Notes in Computer Science, Springer-Verlag Berlin Heidelberg.
Aviad Kipnis and Adi Shamir, *Cryptanalysis of the HFE Public Key Cryptosystem*, vol. 1666, pp. 1-15, Lecture Notes in Computer Science, Springer-Verlag Berlin Heidelberg.
Jacques Patarin, *Cryptanalysis of the Matsumoto and Imai Public Key Scheme of Eurocrypt '98*, Designs, Codes and Cryptography, 20, 175-209, 2000. Kluwer Academic Publishers, Boston.
Nicolas T. Courtois and Jacques Patarin, *About the XL Algorithm over GF(2)*, CT-RSA 2003, LNCS 2612, pp. 141-157, 2003, Springer-Verlag Berline Heidelberg.
J. Ding and D. Schmidt. *A defect of the implementation schemes of the TTM cryptosystem*, University of Cincinnati, Preprint 2003.

*Primary Examiner*—Kambiz Zand
*Assistant Examiner*—Abdulhakim Nobahar

(57) ABSTRACT

The invention relates to two cryptographic processes based on composition of multivariable maps: 1) low degree maps for asymmetric cryptographic communication process; 2) high degree maps for symmetric cryptographic communication process.

The cryptographic process establishes a correspondence through either a low degree (asymmetric) or a high degree polynomial map (symmetric) between a first vector (X) represented by $(x_1, x_2, \ldots, x_n)$ of a finite field (K) and a second vector $(Y)=(y_1, y_2, \ldots, y_m)$ of the same field, n and m being integers not too small. The said polynomial map $y_i=f_i(x_1, x_2, \ldots, x_n)$ is derived from composition of various nonlinear and linear maps. The novel elements for the asymmetric invention include the use of inseparable small variable maps with hidden equations, generalized de Jonquiere maps, and the combination of these maps with other maps. The novel elements of the symmetric invention include the efficient construction of high degree maps and the combination of various kinds of maps.

5 Claims, 3 Drawing Sheets

MULTIVARIABLE CRYPTOSYSTEM

CROSS REFERENCE TO RELATED APPLICATION

The present application claims the benefit of U.S. Provisional Patent Application Ser. No. 60/371,962, filed Apr. 11, 2002, entitled "OPEN-KEY MULTIVARIABLE CRYPTOSYSTEM" to Jintai Ding, PhD.

FIELD OF THE INVENTION

The invention relates to cryptographic communication processes both asymmetric (public) and symmetric (secret). It can be used for a broad range of fields including data transmission, authentication, signature, smart card and date storage to protect privacy.

BACKGROUND OF THE INVENTION

In the field of asymmetric communication process, the first and most well-known solution was invented in 1977. It was the subject of U.S. Pat. No. 4,405,829 filed by the inventors Rivest, Shamir and Adleman (RSA) on Dec. 14, 1977. RSA solution has two types of keys. The first key (public) allows the enciphering of messages and the second (private) allows their deciphering. This process is the first asymmetric cryptography, whose name comes from the fact that the keys for enciphering process and deciphering process are completely different. In an open network, each member possesses a public key known by anyone and the private key that must never be revealed. The RSA process can also be used for various purpose including signature and authentication, etc.

This cryptographic communication process has serious drawbacks. The numbers to be used are very large, with a currently believed requirement of 1000 bit keys for security. Thus, calculation complexity is high and the signatures are very long. Moreover, the security of RSA would be compromised if new breakthroughs in integer factorization were to be achieved. For instance, should the intense global development efforts of a quantum computer be successful, it has been shown that RSA would be unusable for secure encryption.

Alternative asymmetrical cryptographic communication processes have been sought to replace RSA. One type of new methods is to use maps (functions) of multi-variables. This idea has a very strongly support by a proven result in computation theory that solving a set of general polynomial equations over finite fields is impossible (NP-hard), which therefore excludes the predicted attack method of any future quantum computer.

One of the first suggestions of using multi-function maps is the MATSUMOTO-IMAI algorithm, whose security however is entirely insufficient due to vulnerability to a linearization attack method.

Another suggestion is the Tame Transformation Map (TTM) cryptographic process, U.S. Pat. No. 5,740,250 to T. Moh, filed Aug. 9, 1996, which is based on the so called tame transformations in algebraic geometry (for which we prefer a different mathematical name, the de Jonquieres maps). In the TTM cryptographic process, the main map, namely the cipher, is a composition of 4 maps, two linear maps at each end and two tame transformations in the middle. The distinguishing feature of TTM is that instead of treating one large number, it treats a large number of small numbers. The main construction is the establishment of a special equation, which ensures the security and efficiency of the system. However, due to the rigid constructions, in particular, the use of only low rank degree two polynomials, it has been show that all of its implementable schemes are insecure by either minirank method attack or linearization method attack.

Patarin patented another asymmetrical cryptographic schema, called the Hidden Field Equation method (HFE), a generalization of the Matsumoto-Imai system, which is based on low degree public polynomial equations with values in a finite field K, described in U.S. Pat. No. 5,790,675. The secret key makes it possible to hide polynomial equations with value in extensions of the finite field K, thus enhancing security. However, the main map, namely the cipher, is made of the composition of only linear maps and maps of polynomial of either only one variable of the hidden field equation or with small variables however still using only one field. Thus, the structure depends only on one field. A recent relinearization method and more general methods were constructed to attack the HFE system and some of the HFE systems have been broken. For example, a $500 challenge set by the inventor was actually broken with a PC by a French mathematician Jean-Charles Faugere using the Groebner basis. These attack methods showed that the security can be ensured only if the degree of the low degree public polynomials is not too low. However the higher the degree becomes, the slower and the more complex the decryption process becomes. Though a small variable map is indeed suggested, without the idea of using additional hidden equations, the complexity to invert such a map in this case makes it much less efficient, therefore unusable.

These deficiencies in the known encryption techniques are described in publications such as J. Ding, D. Schmidt. *A defect of the TTM implementation schemes*, University of Cincinnati, Preprint 2003;

Jacques Patarin, Cryptanalysis of the Matsumoto and Imai Public Key Scheme of Eurocrypt '88, *Volume* 0963, *pp* 0248, *Lecture Notes in Computer Science*, Springer-Verlag Berlin Heidelberg;

Nicolas T. Courtois, The Security of Hidden Field Equations (HFE), *Volume* 2020, *pp* 0266, *Lecture Notes in Computer Science*, Springer-Verlag Berlin Heidelberg;

Aviad Kipnis, Adi Shamir, Cryptanalysis of the HFE Public Key Cryptosystem by Relinearization, *Volume* 1666, *pp* 0019, *Lecture Notes in Computer Science*, Springer-Verlag Berlin Heidelberg;

Nicolas T. Courtois, Jacques Patarin, About the XL Algorithm over $GF(2)$, *Volume* 2612, *pp* 141–157, *Lecture Notes in Computer Science*, Springer-Verlag Berlin Heidelberg; and Louis Goubin, Nicolas T. Courtois, Cryptanalysis of the TTM Cryptosystem, *Volume* 1976, *pp* 0044, *Lecture Notes in Computer Science*.

In addition to the previously described asymmetric cryptography, many if not most applications rely upon symmetric cryptography. In the field of symmetric communication process, the earliest inventions trace back to the very beginning of human civilization. The more recent stories are those stories of code breaking in the Second World War. The famous most recent one is the Data Encryption Standard (DES) invented by IBM, a 64-bit implementation that was set as the security standard by the US government. Most recently, a new standard, Advanced Encryption Standard (AES) has accepted.

The need for the new standard with ever increasing key lengths is similar to that described above for asymmetric encryption. Advances in processing capabilities increasing make existing symmetric encryption vulnerable.

With increasing dependence on electronic communication for sensitive transactions, the need for improvements to both symmetric and asymmetric cryptographic systems is becoming pronounced. In particular, a need for enhanced security exists, which is compounded by the need for computational and transmission efficiency. For example, consumers have a wide range of portable electronic devices (e.g., personal digital assistants (PDA), notebook computers, web-enabled wireless telephones, smart cards, etc.) that may be used to effect a financial transaction. However, the available processing capability and network transmission bandwidth may be limited in some instances. Providers of various financial transactions wish to make their services available to a large number of institutions and consumers. Yet these providers also need to maintain a certain degree of security to avoid embarrassing breaches of privacy and monetary damages.

Consequently, a significant need exists for an improved asymmetric and an improved symmetric encryption approach that are secure, even should significant breakthroughs occur in computational speed and capacity.

BRIEF SUMMARY OF THE INVENTION

The present invention addresses these and other problems in the prior art with a method and apparatus for encrypting and decrypting messages in an asymmetric fashion that combines different types of nonlinear maps, each chosen to defeat the known methods of attack yet resulting in a practical computational requirements for encryption and decryption.

In one aspect of the invention, the method of asymmetric encryption employs a hidden equation(s) that is not a hidden field equation (HFE), and thus its choice has nothing to do with the field. A small variable map has special hidden equations to ensure the security and efficiency. The main purpose of the hidden equations is to ensure a fast decryption process. Unlike the TTM and HFE, which uses only one kind of nonlinear maps (i.e., the tame transformation for the TTM and the HFE maps for the HFE), three kinds of nonlinear maps are employed (i.e., inseparable small variable maps with hidden equations, a generalized de Jonquieres maps, and de Jonquieres maps). One purpose of combining these three kinds of maps is that they cover each others weaknesses to achieve the maximum security. In particular, the generalized de Jonquieres maps and de Jonquieres maps prevents the attack of the relinearization attack and the inseparable small variable maps with hidden equations prevents the minirank attack and the linearization attack.

In another aspect of the invention, a symmetric cryptographic communication process establishes a correspondence between a first vector (X) represented by n elements $(x_1, x_2, \ldots, x_n)$ of a finite field (K) and a second vector (Y) represented by m elements $(y_1, y_2, \ldots, y_m)$ of this finite field, however, the correspondence is advantageously made through a high degree polynomial map. This map and the inverse map are constructed to be high degree maps through composition of simple maps, such that evaluation of each composition factor is easy to calculate, but it is impossible to write down explicitly the composite maps in terms of polynomial expansions because the exponential growth of the size of multi variable polynomial in terms of its total degree. The security of such a system relies first upon the level of difficulty to find the composite map, which is impossible because of its size. Second, security relies upon the complexity of the problem of factorization of maps, of which virtually nothing is known except the case of one variable over a polynomial ring and not functions over a finite field or ring. Third, the security relies upon mixing of various kinds of maps to avoid a weakness due to some mathematical structure of the composite map. The level of the difficulty of map factorization problem is manifested in the well-known Jacobian conjecture in mathematics, which has withstood scrutiny for the past last 50 years.

In yet another aspect of the invention, asymmetric and symmetric systems have been blended into a unified system. In particular, a secure communication entails using the asymmetric cryptosystem to transmit a secret cipher to an end user, who thereafter uses the secret cipher to perform the symmetric cryptosystem. Thereby, many end users may be able to access the secret cipher for efficient and secure communications, such as by enabling a smart card that thereafter performs a financial transfer or purchase.

These and other objects and advantages of the present invention shall be made apparent from the accompanying drawings and the description thereof.

BRIEF DESCRIPTION OF THE FIGURES

The accompanying drawings, which are incorporated in and constitute a part of this specification, illustrate embodiments of the invention, and, together with the general description of the invention given above, and the detailed description of the embodiments given below, serve to explain the principles of the present invention.

DETAILED DESCRIPTION OF THE INVENTION

Figure 1:
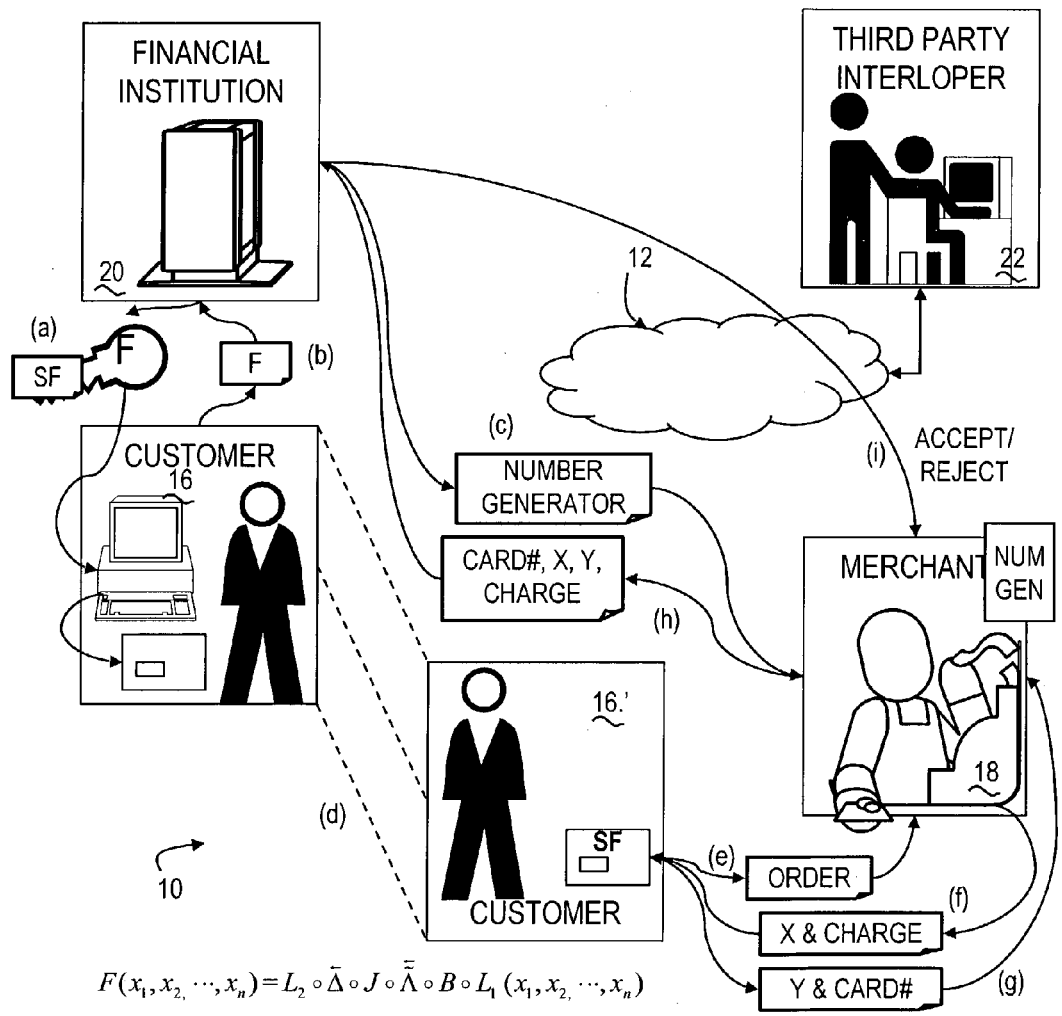
FIG. 1 is a diagram of a multivariable cryptosystem network for symmetric and asymmetric cryptographic communication.

FIG. 1 depicts a multivariable secure communication network 10 that allows efficient and highly secure digital communication across an open communication channel, depicted as internet 12. In particular, relatively noncomplex end user devices, depicted as a smart card 14, are able to perform highly secure asymmetric (i.e., public-private keyed) and surely also symmetric (secret keyed) cryptographic digital communications with modest computational and transmission bandwidth. Yet, a third party 20 attempting to intercept and decrypt either the asymmetric or symmetric cryptographic communication would be unable to employ the known methods of attack (i.e., linearization, relinearization, or minirank, etc.) even with a breakthrough advance in computational capacity (e.g., a so-called "quantum computer").

In particular, FIG. 1 depicts a customer 16 contacting the financial institution 20 with the customer's open key "F" (step (a)) to authenticate and to request an account. The financial institution 20 uses the open key to return in a secure manner a secret key "SF" (step (b)). The secret key SF is then stored on the smart card 14. Meanwhile, the financial institution 20 has also sent a number generator 24 to the merchant 18 (step (c)). At a later time (step (d)), the customer 16' submits an order to the merchant 18 (step (e)). The merchant 18 sends to the customer 16 a number x (time dependent) and the charge (step (f)). The customer 16' sends back a number y processed by the smart card and its card number (Step (g)). The merchant 18 sends the card number, x (including its time), y, charge to the financial institution 20 (step(h)). The financial institution uses its record of SF and number generator to verify the whole transaction including both the customer 16' and the merchant 18 to either accept or reject it and send the decision to the merchant 18 (step (i)).

The present asymmetric invention relates to an asymmetric cryptographic communication process which establishes a correspondence between a first vector (X) represented by n elements $(x_1, x_2, \ldots, x_n)$ of a finite field (K) and a second vector (Y) represented by m elements $(y_1, y_2, \ldots, y_m)$ of this finite field through a low degree polynomial map, n and m being integers not too small. This correspondence is established through a map F derived from composition of simple maps $G_1, G_2, \ldots, G_{k-1}, G_k$:

$$F(x_1, x_2, \cdots, x_n) = G_1 \circ G_2 \circ \ldots \circ G_{k-1} \circ G_k(x_1, x_2, \cdots, x_n)$$
$$= (f_1(x_1, x_2, \cdots, x_n), f_2(x_1, x_2, \cdots, x_n), \ldots,$$
$$f_m(x_1, x_2, \cdots, x_n))$$
$$= (y_1, y_2, \cdots, y_m),$$

where $f_i(x_1, x_2, \ldots, x_n)$ is a low degree polynomial.

The present asymmetric cryptographic system first avoids the drawbacks of the three examples in that it cannot be attacked by linearization attack, relinearization attack, or the minirank attack by utilizing the inseparable small variable maps with hidden equations in combination with a new generalized de Jonquieres maps and the de Jonquieres maps. In addition, the asymmetric cryptographic system has advantages like efficiency and security over known approaches and can be used for the various purposes like authentication, enciphering and digital signature.

Like the previous three examples, the security relies upon the complexity of solving of multivariable low degree equations. The main novel features that ensure the security is that the use of the inseparable small variable maps with hidden equations, the de Jonquieres maps, and the generalized de Jonquieres maps, which allows a great amount of random choices, and the maps are not necessarily bijective but still have very low multiplicity when we invert the maps (e.g., could be less than 17); the use of the generalized de Jonquieres maps and the de Jonquieres maps makes the relinearization attack inapplicable due to the disappearance of a unified structure (one field) of the construction, the use of the inseparable small variable method makes linearization method attack and the minirank method inapplicable. All of these ensure a secure asymmetric communication process with a very short bits (e.g., 300), but can actually have it be much shorter (e.g., 132), for example, for digital signature purposes, where we only use the inseparable small variable maps with hidden equations, which is much shorter than any one used at present. At least 512 bits is required when using RSA. One more advantage compared to the HFE method on the same security is that in the decryption process the hidden equation ensures that we solve a polynomials of a much smaller degree (e.g., 8), on a field of size, for HFE, it is suggested to be $2^{13}$=8192, which actually must be so due to the relinearization attack, therefore a much faster process, and for signature the HFE requires at least 128 bits. All the new features make them particularly advantageous for use in low-power chip cards like smart cards.

Our invention's security is largely enhanced by the combination of different kinds of maps. The advantage of combining these maps together is to mix different structures such that we cannot separate them to use their structures to attack the communication system.

The concept of "low degree" mentioned above must be understood as a designated degree less than or equal to 6, preferably to be 2, but not 1.

Symmetric Encryption

The present symmetric invention relates to a symmetric cryptographic communication process which also establishes a correspondence between a first vector (X) represented by n elements $(x_1, x_2, \ldots, x_n)$ of a finite field (K) and a second vector (Y) represented by m elements $(y_1, y_2, \ldots, y_m)$ of this finite field, however, through a high degree polynomial map. This map and the inverse map are constructed to be high degree maps through composition of simple maps, such that evaluation of each composition factor is easy to calculate, but it is impossible to write down explicitly the composite maps in terms of polynomial expansions because the exponential growth of the size of multi variable polynomial in terms of its total degree. The security of such a system relies on first the level of difficulty to find the composite map, which is impossible because of its size, the complexity of the problem of factorization of maps, which we know virtually nothing about except the case of one variable over a polynomial ring, not functions over a finite field or ring, and the possibility of weakness due to some mathematical structure of the composite map, which it apparently does not have because of the mixing of various kinds of maps. The level of the difficulty of map factorization problem is manifested in the well-known Jacobian conjecture in mathematics, which nobody could do really do anything about it in the last 50 years.

This system is particularly applicable for the relatively noncomplex end user devices, like a smart card 14, to perform highly secure cryptographic digital communications with modest computational and transmission bandwidth overhead.

The embodiment disclosed below is not intended as an exhaustive description or a restriction of the invention to the exact same form disclosed in the following detailed description. Rather, it is chosen and described such that others skilled in the art may utilize its teachings. The encryption and decryption method of the present invention is not limited to a particular form of hardware or system configuration, rather may be broadly applied in a variety of both hardware and software computer setting. The invention involves the preservation of privacy in any form that can be digitized.

The digitized data is subject to both an encryption algorithm and decryption algorithm. In an asymmetric setting, one of the two encryption keys is made publicly accessible, for example, while the other encryption key is maintained privately. In the case of symmetric setting, both are there is essentially one key encryption key, which is kept strictly private.

Mathematical Definitions

K is finite field of characteristic p, where there are only finite elements and it has a structure just like rational numbers with addition and multiplication. Let K have $q=p^e$ elements inside.

One example is $\mathbb{F}_{29}$, which contains 29 number from 0 to 28 and in $\mathbb{F}_{29}$ addition and multiplication are the same as ordinary number except that at the end we always modular it by 29. For example in $\mathbb{F}_{29}$, 21+11=3 (32 modular 29) and 5×6=1 (30 modular 29).

Let $K^N$ be the product space K×K ... ×K (n times), each element in $K^N$ can be presented as $(a_1, a_2, \ldots, a_{N-1}, a_N)$, and $a_i$ is an element in K A map G from $K^N$ to $K^M$ is an operation that for that any given element $A=(a_1, a_2, \ldots, a_{N-1}, a_N)$ in $K^M$, it produces a few elements (or no element) in $K^M$; and the inverse of G, $G^{-1}$ is defined as given any elements B in $K^M$, it produces all the possible elements A in $K^N$ such that G(A)=B.

For example in $\mathbb{F}_{29}$, a map f from $\mathbb{F}_{29}^2$ to $\mathbb{F}_{29}^2$ is defined as $$f(a_1, a_2) = (a_1^2, a_2^2)$$

and its inverse is $$f^{-1}(a_1, a_2) = (\pm\sqrt{a_1}, \pm\sqrt{a_2}); (\pm\sqrt{a_1}, \pm\sqrt{a_2})$$ if both $a_1, a_2$ have square roots, otherwise the answer is null.

Here by inverse of a map, we do not follow the exact standard notation in mathematics but rather use it as the process to find the pre-image(s) for any given image for our maps. A map and its inverse in general correspond to the encryption and decryption process.

One standard way of defining a map is to use polynomials.

A field extension with a degree of N of K is any isomorphic algebraic structure derived from the polynomial ring K(x) with a variable x modular of a polynomial γ(x) which does not have any polynomial factors. We call the new field $\overline{K}$ and it has $q^N$ elements.

This field $\overline{K}$ has a basis of $E_1, E_2, \ldots, E_N$ such that every element ε of $\overline{K}$ can be uniquely expressed in the form: $\epsilon = a_1 E_1 + a_2 E_2 + \ldots + a_{N-1} E_{N-1} + a_N E_N$ that $a_i$ is an element in K.

There is an isomorphic map Ψ as linear spaces from the product space $K^N$ to $\overline{K}$:

$$\Psi(a_1, a_2, \ldots, a_{N-1}, a_N) = a_1 E_1 + a_2 E_2 + \ldots + a_{N-EN-1} + a_N E_N,$$

and its inverse $$\Psi^{-1}(a_1 E_1 + a_2 E_2 + \ldots + a_{N-1} E_{N-1} + a_N E_N) = (a_1, a_2, \ldots, a_{N-1}, a_N).$$

We divide a large vector of length SN into S equal length n vectors, namely let S be a small integer, there is an isomorphic map $\overline{\Psi}_S$ from $\overline{K}^S$ to $K^{Sp}$ given by $$\overline{\Psi}_S(a_1, a_2, \ldots, a_{SN-1}, a_{SN}) = (\Psi(a_1, a_2, \ldots, a_{N-1}, a_N),$$
$$\Psi(a_{N+1}, a_{N+2}, \ldots, a_{2N-1}, a_{2N}), \ldots,$$
$$\Psi(a_{(s-1)N+1}, a_{(s-1)N+2}, \ldots, a_{SN-1}, a_S$$
$$= (Z_1, \ldots, Z_{S-1}, Z_S).$$

Below, we will introduce a few families of multivariable maps over the finite field K. Those maps are the building blocks of the present inventions and those building blocks will be put together to construct the cryptographic communication process.

The first new type of maps we define is an inseparable small variable map with hidden equations of type (S, D, Λ), S>1 is a small integer.

Let $z_i$ be a element in $\overline{K}$, $V(z_1, z_2, \ldots, z_s)$ be a map in the form of $V(z_1, z_2, \ldots, z_s) = (V_1(z_1, z_2, \ldots, z_s), V_2(z_1, z_2, \ldots, z_s), \ldots, V_T(z_1, z_2, \ldots, z_n))$ from $\overline{K}^S$ to $\overline{K}^T$ such that 1) there is a few (or one) hidden equations satisfied by the components $V_i(z_1, z_2, \ldots, z_s)$
2) the maximum number of roots for any given set of values of $(V_1', V_2', \ldots, V_T')$, the equation: $(V_1(z_1, z_2, \ldots, z_s), V_2(z_1, z_2, \ldots, z_s), \ldots, V_T(z_1, z_2, \ldots, z_n)) = (V_1', V_2', \ldots, V_T')$ is Λ;
3) we need at most $\overline{C}$ (small) calculations to solve this set of equations, its total degree D is small and the number of computations needed to calculate $V(z_1, z_2, \ldots, z_s)$ for a given set of values of $(z_1, z_2, \ldots z_s)$ is C (small);
4) let $\Delta(x_1, x_2, \ldots, x_{SN}) = \Psi^{-1}{}_T \circ V \circ \Psi_S(x_1, x_2, \ldots, x_{SN})$ a map from $K^{SN}$ to $K_{TN}$, and we cannot use linear combinations of the components of components of $\Delta(x_1, x_2, \ldots, x_{SN})$ to derive a functions with smaller number of variables (inseparable);

we call $\Delta(x_1, x_2, \ldots, x_{SN})$ a inseparable small variable map of type (S, D, Λ).

EXAMPLE 1

$V(z_1, z_2, z_3) = (V_1(z_1, z_2, z_3), V_2(z_1, z_2, z_3), V_3(z_1, z_2, z_3))$, is randomly but properly chosen homogenous degree 2 maps, and still satisfies the equation:

$$(\beta_1 z_1 + \beta_2 z_2 + \beta_3 z_3)^2 (\alpha_1 z_1 + \alpha_2 z_2 + \alpha_3 z_3) = z_1 V_1(z_1, z_2, z_3) + z_2 V_2(z_1, z_2, z_3) + z_3 V_3(z_1, z_2, z_3))$$

Here we require p is not 2.

We call the equation above the hidden equation. The inverse of V is to solve the equation:

$$(V_1(z_1, z_2, z_3), V_2(z_1, z_2, z_3), V_3(z_1, z_2, z_3)) = (V_1', V_2', V_3')$$

Because of the hidden equation:

The equation above can be transformed through change of basis into a new equation:

$$(\hat{V}_1(x, y, z), \hat{V}_2(x, y, z), \hat{V}_3(x, y, z), z) = (V_1', V_2', V_3', x^2 y)$$

or something even simpler (though very unlikely), which can be solved easily and $\hat{V}_1(x, y, z)$, $\hat{V}_2(x, y, z)$, $\hat{V}_3(x, y, z)$ are degree two polynomials derived from a change of basis.

The principle of the example is that even $V(z_1, z_2, z_3) = (V_1(z_1, z_2, z_3), V_2(z_1, z_2, z_3), V_3(z_1, z_2, z_3))$, is randomly but properly chosen maps satisfying the equation:

$$\Theta(\beta_1 z_1 + \beta_2 z_2 + \beta_3 z_3, \alpha_1 z_1 + \alpha_2 z_2 + \alpha_3 z_{d\ 3}) = z_1 V_1(z_1, z_2, z_3) + z_2 V_2(z_1, z_2, z_3) + z_3 V_3(z_1, z_2, z_3)),$$

the hidden equation, where Θ(x, y) is a randomly but properly chosen, such that the map can be easily and efficiently inverted. Without such a hidden equation, the map, otherwise, would be very much harder to invert in terms of standard methods.

The inverse of V is also to solve the equation:

$(V_1(z_1, z_2, z_3), V_2(z_1, z_2, z_3), V_3(z_1, z_2, z_3)) = (V_1', V_2', V_3')$

Because of the hidden equation:

The equation above can be transformed through change of basis into a new equation: $(\hat{V}_1(x, y, z), \hat{V}_2(x, y, z), \hat{V}_3(x, y, z), z) = (V_1', V_2', V_3', \Theta(x, y))$ or something even simpler that can be solved easily.

EXAMPLE 2

$V(z_1, z_2)=(V_1(z_1, z_2, g(z_1, z_2), V_2(z_1, z_2, g(z_1, z_2))$ is a K linear projection map from $\overline{K} \times \overline{K}$ to a small dimension subspace in $\overline{K}$ $\nabla(z_1, z_2, z_3)=(V_1(z_1, z_2, z_3), V_2(z_1, z_2, z_3))$, is ramdomly but properly chosen maps such that 1) $V_i(z_1, z_2, z_3) = \Sigma a_{i,\alpha} z_\alpha^{q^i} + \Sigma a_{i,j,\alpha,\beta} z_\alpha^{q^i} z_\beta^{q^j}$, which ensure that we will have a degree 2 map on K, the degrees of $z_1, z_2$ are small and there is no $z_1^i z_3^j$ or $z_2^i z_3^j$ terms for both I and j are nonzero;
2) they satisfy the equation: $\theta(\beta_1 z_1 + \beta_2 z_2) = z_1 \nabla_1(z_1, z_2, 0) + z_2 \nabla_2(z_1, z_2, 0)$, where $\theta(x)$ is a small degree polynomial.

Here we can choose the degree of $V_i$ to be very high degree but still we can invert the map easily due to the substitution of the hidden equation in 2) and the low dimension of the image of g(x,y), which allows us to find the inverse by a search on the image space and then solving the low degree equation.

Here all $\theta$, g, $V_i$ equations are hidden equations.

EXAMPLE 3

$V(z_1)=(\nabla(z_1, g(z_1))$, here $g(z_1)$ is a K linear projection map from $\overline{K}$ to a small dimension subspace in $\overline{K}$.

$\nabla(z_1, z_2)$ is randomly but properly chosen maps such that
1) $\nabla(z_1, z_2) = \Sigma a_{i,\alpha} z_\alpha^{q^i} + \Sigma a_{i,j,\alpha,\beta} z_\alpha^{q^i} z_\beta^{q^j}$, which ensure that we will have a degree 2 map on K, and the degrees of $z_1$ are small;

Here we can again choose the degree of $\nabla$ to be very high degree but still we can invert the map easily due to the low dimension of the image of g(x), which allows us to find the inverse by a search on the image space and then solving the low degree equation.

Here all g, $\nabla$ equations are hidden equations.

In this case, in the definition of V, $g(z_1)$ can also be substituted by $g(z_2)$, and similarly for other cases.

A de Jonquieres map of type (k, D) is a map from $K^k$ to itself is define as:

$$J(x_1, x_2, \ldots, x_k)=(x_1, x_2+J_1(x_1), x_3+J_2(x_1, x_2), \ldots, x_k+J_{k-1}(x_1, x_2, \ldots, X_{k-1})),$$

where $J_i(x_1, \ldots, x_{k-1})$ is a polynomial and D is total degree of $J(x_1, \ldots, x_k)$ and C(small) is the number of computations we need to evaluate the value of $J(x_1, \ldots, x_k)$ for a given set of value of $(x_1, \ldots, x_k)$ and $\overline{C}$ (small) for its inverse.

A generalized de Jonquieres map of type (r, D, $\Lambda$).
We first define a map from $\tilde{K}^U$ to itself is define as:

$$\tilde{J}(\tilde{x}_1, \tilde{x}_2, \ldots, \tilde{x}_U)=(\tilde{x}_1, \tilde{x}_2, \ldots, \tilde{x}U-r, \tilde{J}_1(\tilde{x}_1, \tilde{x}_2, \ldots, \tilde{x}_U), \ldots, \tilde{J}_r(\tilde{x}_1, \tilde{x}_2, \ldots, \tilde{x}_U)),$$

where $\tilde{J}_i(\tilde{x}_1, \ldots, \tilde{x}_U)$ is a polynomial, C is the number of computations we need to evaluate the value of $\tilde{J}(\tilde{x}_1, \ldots, \tilde{x}_U)$ for a given set of value of $(\tilde{x}_1, \ldots, \tilde{x}_U)$, and $\overline{C}$ (small) is the number of computations we need to find the roots if we are given specific values of $\tilde{J}(\tilde{x}_1, \ldots, \tilde{x}_U)$ and R is the maximum number of roots. Here $\tilde{K}$ is a degree $\tilde{N}$ extension of K and $\tilde{\Psi}, \tilde{\Psi}^{-1}, \tilde{\Psi}_U, \tilde{\Psi}_U^{-1}$ are defined like $\Psi, \Psi^{-1}, \overline{\Psi}$, above.

We call the map:

$$\tilde{\Delta}(x_1, x_2, \ldots, x_{U\tilde{N}})=\Psi^{-1}{}_U \circ \tilde{J} \circ \Psi_U(x_1, x_2, \ldots, x_{U\tilde{N}}),$$

a generalized de Jonquieres map of type (r, D, $\Lambda$), where D is total degree of $\tilde{\Delta}(x_1, x_2, \ldots, x_{U\tilde{N}})$ We require for all cases that C and $\overline{C}$ to be small.
Permutation polynomial maps.

This includes mainly three family of maps derived from three types of functions: (a) Dickson polynomial; (b) Multivariable Dickson polynomial; and (c) Reidei functions.
For example, Dickson type maps:
A Dickson function on K is defined as:

$$D_{n,a}(z)=\left(\frac{z+\sqrt{z^2-4a}}{2}\right)^n+\left(\frac{z-\sqrt{z^2-4a}}{2}\right)^n,$$

where x and a are in K.

The function $\Omega(x_1, x_2, \ldots, x_N)$ defined as:

$$\Omega(x_1, x_2, \ldots, x_N)=\Psi^{-1} \circ D_{n,a} \circ \Psi(x_1, x_2, \ldots, x_N)$$

is a map from $K^N$ to itself and is called a Dickson type map.

Here we require that n is coprime with $(q^N-1)(q^N+1)/2$ if a is not zero and is coprime with $(q^N-1)$ if a is zero. The values of Dickson polynomials can be calculated very efficiently.

An affine linear map is a map from $K^k$ to itself is defined as:

$$L(x_1, x_2, \ldots, x_k)=(A \times (x_1, x_2, \ldots, x_k)^T)+(l_1, l_2, \ldots, l_k),$$

where A is a k×k invertible matrix, $(x_1, x_2, \ldots, x_k)$ and $(l_1, l_2, \ldots, l_k)$ are treated as vectors of size k and $(l_1, l_2, \ldots l_k)$ is a constant vector.

A linear projection map of type (r) from $K^k$ to $K^{k-r}$ is defined as:

$$P(x_1, x_2, \ldots, x_k)=(x_1, x_2, \ldots, x_{k-r}).$$

Embedding map of type (r):

$$B(x_1, x_2, \ldots, x_k)=(x_1, x_2, \ldots, x_k, b_1(x_1, x_2, \ldots, x_k), \ldots, b_r(x_1, x_2, \ldots, x_k)),$$

where $b_1(x_1, x_2, \ldots, x_k), \ldots, b_r(x_1, x_2, \ldots, x_k)$ are polynomials and if they are linear functions then we call it a linear embedding map.

From the definition, we know that all the maps above have inverses that can be efficiently computed, with proper conditions.

I. The Asymmetric Communication Process

Basic inseparable small variable with hidden equations (ISVHE) algorithm for the enciphering/deciphering procedure.

A first version of the novel ISVHE algorithm will be established. This version does not limit us to the exact same form and more general versions are presented subsequently.

We choose field K to be $F_7$, the field with 7 elements from 0 to 6. Each message is composed of n=100 elements of K. We chose $\overline{K}$ be a degree 17 extension of K and $\tilde{K}$ a degree 46 extension of K.

Let "word" or "alphabet" be digitized and be "translated" into elements of K. In the enciphering procedure to be described here, the following objects are kept private or stay secret:

1) two affine linear maps $L_1, L_2$ from $K^n$ to itself and $K^m$ to itself respectively and m=103. These two maps can be represented as a linear function with coefficients in K.
2) The representation of the fields $\overline{K}$ and $\tilde{K}$, which is determined by the choice of irreducible polynomials.
3) An embedded generalized de Jonquieres map of type (1, 2, 2) given by the map $\tilde{\Delta}(x_1, x_2, \ldots, x_{100})=(x_1, \ldots, x_8, \Psi^{-1}{}_U \circ \tilde{J} \circ \Psi_U(x_8, x_2, \ldots, x_{100}), x_{101}, x_{102}, x_{103})$.

$$\tilde{J}(\tilde{x}_1, \tilde{x}_2) = \left(\tilde{x}_1, \tilde{x}_2^2 + \tilde{x}_2 \sum_i^{45} \tilde{a}_i \tilde{x}_1^{7^i} + \sum_{i \leq j}^{45} \tilde{a}_{i,j} \tilde{x}_1^{7^i + 7^j}\right),$$

where the parameters are randomly chosen.

4) A de Jonquieres map of type (2,100) is a map from $K^{100}$ to itself is defined as:

$$J(x_1, x_2, \ldots, x_k) = (x_1, x_2, \ldots, x_{52} + J_{52}(x_1, \ldots, x_{51}), \ldots, x_{54} + J_{54}(x_1, \ldots, x_{53}), x_{55}, \ldots, x_{100}),$$

where $J_i$ are randomly chosen quadratic polynomials. (the formula is modified)

5) an embedded inseparable small variable map with hidden equations of type (3, 2, 8): $\overleftarrow{\Delta}(x_1, x_2, \ldots x_{100}) = (\Psi^{-1}{}_3 \circ V \circ \Psi_3(x_1, x_2, \ldots, x_{51}), x_{52}, \ldots, x_{100})$ and the intermediate maps $V(z_1, z_2, z_3), \Psi^{-1}{}_3, \Psi_3$. Here $V(z_1, z_2, z_3)$ is the Example 1.

6) Embedding map of type (3):

$$B(x_1, x_2, \ldots, x_{100}) = (x_1, x_2, \ldots, x_{100}, b_1(x_1, x_2, \ldots, x_{100}), \ldots, b_3(x_1, x_2, \ldots, x_{100}))$$

where $b_i(x_1, x_2, \ldots, x_{54})$ are randomly chosen degree 2 polynomials.

Let $F(x_1, x_2, \cdots, x_n) = L_2 \circ \overline{\Delta} \circ J \circ \overleftarrow{\Lambda} \circ B \circ L_1(x_1, x_2, \cdots, x_n)$
$= (f_1(x_1, x_2, \cdots, x_n), f_2(x_1, x_2, \cdots, x_n), \ldots, f_m(x_1, x_2, \cdots, x_n)),$ where $f_1(x_1, x_2, \ldots, x_n), f_2(x_1, x_2, \ldots, x_n), \ldots, f_m(x_1, x_2, \ldots, x_n)$ are a set of polynomials of degree D.

Due to that 2 is small, we can compute the values $Y' = (y'_1, y'_2, \ldots, y'_m) = f_1(x'_1, x'_2, \ldots, x'_n), f_2(x'_1, x'_2, \ldots, x'_n), \ldots, f_m(x'_1, x'_2, \ldots, x'_n)$, which is the enciphered text for the plaintext (the original and the secret) $(x'_1, x'_2, \ldots, x'_n)$.

The public objects are:
1) The field K and its structure, and the length n of the messages.
2) The final product of the composition, the set of polynomials $f_1(x_1, x_2, \ldots, x_n), f_2(x_1, x_2, \ldots, x_n), \ldots, f_m(x_1, x_2, \ldots, x_n)$, which therefore enable anyone to encipher a message. This is the public enciphering algorithm.

Figure 2:
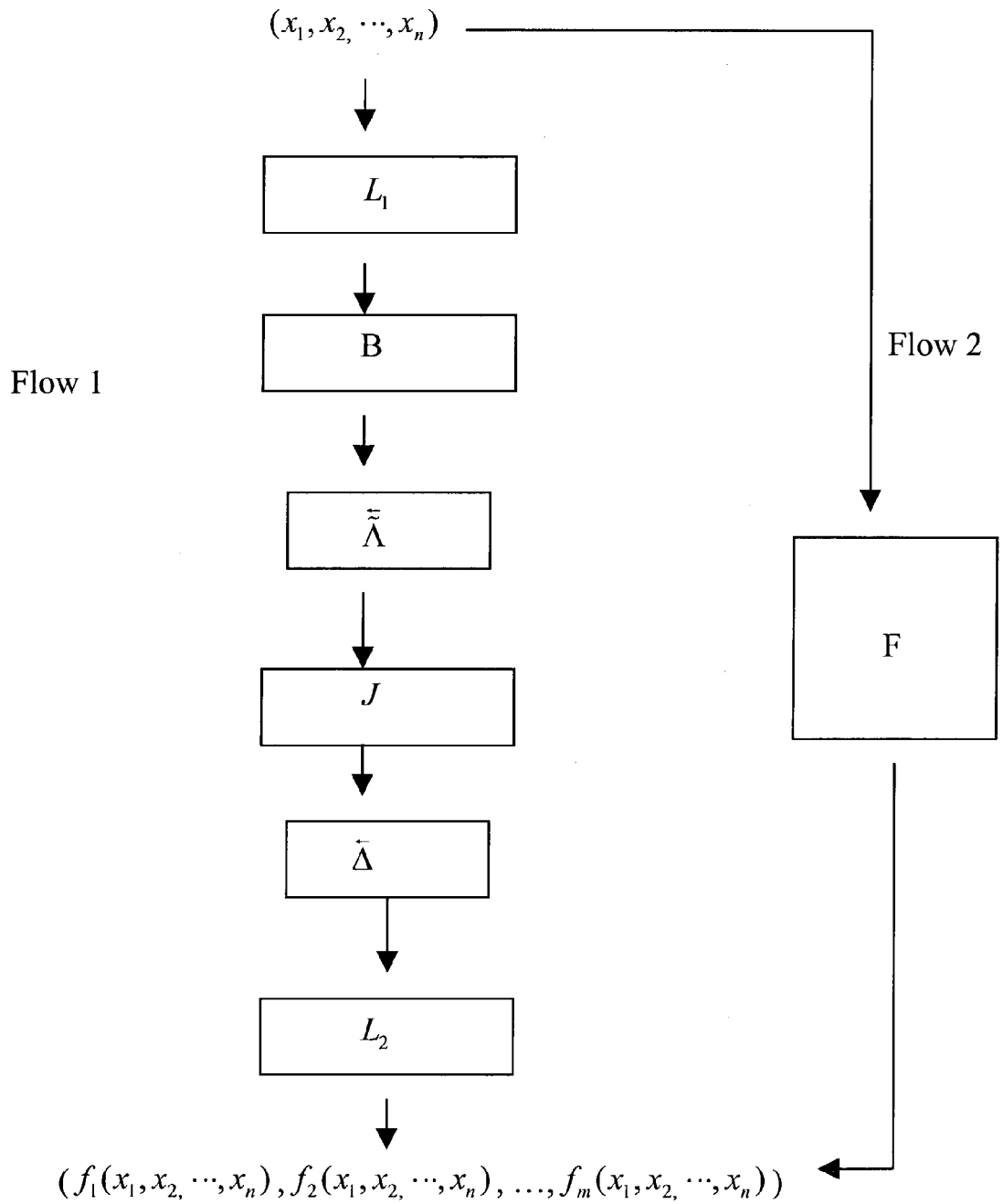
FIG. 2 is a flow diagram of an illustrative enciphering procedure for the network of FIG. 1 when a financial institution sends a secret key SF to the customer using the customer's open key F.

The enciphering procedure is visually described as in FIG. 2, the operations runs from top to bottom and the two flows are equivalent. In the case of first flow, $L_1$ first, then B and finally $L_2$. However, anyone who wants to send a message to someone who has the public key $f_1(x_1, x_2, \ldots, x_n), f_2(x_1, x_2, \ldots, x_n), \ldots, f_m(x_1, x_2, \ldots, x_n)$ and the field K, the enciphering is only the second flow because all the components of the first flow is kept secret.

Moreover, deciphering is possible due to the first flow, namely all the secret objects, are known. In effect, it is then possible to invert all the operations in the first chart flow described in FIG. 2. Thus, all the inversions are very easy and fast, except $\overleftarrow{\Lambda}$ and $\overleftarrow{\Lambda}$, for which we need to solve multivariable equations with one variable of degree 8 or of 2.

First, it must be noted that the inverse is not always necessary bijective and we possibly will derive a few antecedents, but the embedding map B will basically eliminate the unwanted ones. The elimination to find the right choice of the original text can also be determined with following methods:
1) add an linear embedding map composed in front of $L_1$;
2) use hash functions;
3) insert certain redundancy into the original text, and the deciphered text will be the one which contains this redundancy.

We can use only one of them or combine them together, and it will be necessary to do it systematically. For our practical examples, the number of antecedents is very small (16), which is much smaller than that for the HFE, the above method works very efficiently.

Example of signature algorithm.

The mathematical setting is very similar as above, but we choose field K to be $F_3$.

Given a message M to be signed, we first apply a "hash" function applied to it to derive a short message H as an element in $K^n$. However because the map above is not bijective, we propose to define a slightly different map:

$F(x_1, x_2, \ldots, x_n) = P \circ L_2 \circ \overleftarrow{\Lambda} \circ L_1(x_1, x_2, \ldots, x_n)$, where, n=66 P is the projection map of type 10 from $K^{66}$ to $K^{56}$ is define as: $P(x_1, x_2, \ldots, x_{66}) = (x_1, x_2, \ldots, x_{56})$. And for $\overleftarrow{\Lambda}$, $\overline{K}$ is a degree 22 extension of K. The signature Q is given as $Q = F^{-1}(H)$.

Because $F(x_1, x_2, \ldots, x_n) = (f_1(x_1, x_2, \ldots, x_n), f_2(x_1, x_2, \ldots, x_n), \ldots, f_m(x_1, x_2, \ldots x_n))$, the enciphering map is public, anyone can verify the signature by executing: $H' = F(Q)$ and by verifying that $H' = H$. The sender of the signature must obviously know the secret in order to calculate Q.

Here we choose a number of bits at the input which is greater than the number of bits at the output, in order to be almost certainly able to calculate antecedents using the ISVHE algorithm. H is expressed in 108 bits and Q in 128 bits.

Specific cases of implementation.

There are various ways to implement the ISVHE algorithm all of which offer advantages related to its practical execution and implementation.
1) The case of the proper choice of the embedding map, the generalized de Jonquieres map and the de Jonquieres map that can be easily computed.

This version will make both public and private computation faster.

2) Unlike the HFE case, the decryption process can be faster by implementing a faster algorithm to solve degree 2 and degree 8 polynomials.

3) The field multiplication can be made into pre-stored table to enhance the efficiency. This version of signature is very useful because it may be implemented efficiently in a small processors, like, in smart cards. In the case of HFE, this is proposed through using small branches, which however causes weakness in security.

Variant of the ISVHE algorithm.

Of course, the description of the SV algorithm and its variants does not limit the invention claimed to the utilization of polynomial equations with only one degree: the degree 2. It is entirely possible to use the degree 3; in this case there is a public form with the degree 3. Likewise, the degree 4 or even 5 is also possible. However, it is necessary for the degree to be low enough so that the public equations resulting from them remain easy for a computer to store and to compute and in general the lower the better, but not degree 1.

The choice of specific parameters of our maps are also very important in order to ensure maximum security and to elude, as much as possible, any attack of cryptanalysis. Thus, for security reasons, it is preferable that:
1) the length of spaces both V and J should not be too small and we should have at least a non trivial J in the middle;
2) there should be no first order or second order linearization equations that are satisfied by the plaintext and the ciphertext;
3) more generally, for security purposes, it is preferable that there be no equation with a "low" degree which is always verified between the coordinates of the original and enciphered messages, except for the linear combinations of the products of the public equations in small polynomials).

Those skilled in the art having the benefit of the present disclosure will appreciate that Examples 2 and 3 may also be used for this purpose. In addition, the map $\bar{V}$ may be used directly as well with certain hidden conditions.

Variants of the ISVHE algorithm related to the HFE algorithm.

In the HFE patent, the inventor did mention the possibility to use the intermediate variables. However, the three variable construction of our inseparable small variable maps with hidden equations was never constructed by anyone for such a purpose and the way we solve it does not belong to any standard solving method as suggested in HFE patent, the idea of hidden equation was not suggested anywhere;
1) specific type of small variable maps with hidden equations suggested in this invention, in particular the inseparable property was not specified in the HFE patent, which otherwise can easily cause security problems, for example the use of small branches in the HFE case;
2) the specific advantageous property that we have to solve very low degree polynomials (e.g., 8, and 2) due to the hidden equation was also not specified anywhere before;
3) all other known small variable maps, in general, are either not able stand alone to be both efficient and secure or much more inefficient.

Therefore ISVHE is not a variant of HFE. However we could have variants of ISVHE using HFE, in particular, like in the given implementation example above the ISVHE map A can be replaced by HFE maps, which may not be necessarily secure by itself There are invariants coming from different implementations.

There are other possible variants by implanting different methods for eliminating the redundancy in the decryption process.

There are also invariants coming from using more or fewer composition factor:
1) it is possible to use only linear type and the inseparable small variables with hidden functions;
2) it is possible to add more the de Jonquieres and the generalized de Jonquieres maps There are also possible invariants from not just inseparable 3 variable maps but also 4 or 5 or higher. But we must choose them properly to make sure the efficiency.

The Symmetric Communication Process.

A simple version of the novel symmetric composite SC algorithm will be established. This version does not limit us to the exact same form and more general versions are presented subsequently.

Let K be a finite field $F_{251}$, where 251 is a large prime number of 8 bits. Let $\check{K}$ be a degree three extension of K and $\Phi$ is the invertible map from $K^3$ to $\check{K}$.

Let $L_1, \ldots, L_4$ be 4 randomly chosen invertible linear maps from $K^3$ to itself and let Let $$J_1(x_1, x_2, x_3)=(x_1, J_2(x_1, x_2), J_3(x_1, x_2, x_3))=(x_1, x_2+9x_1^{35}+43x_1^{113}, x_3+11J_2(x_1, x_2)^{157}+89x_1^{54}x_2^{127})$$

Let $$D_{1547,a}(z) = \left(\frac{z+\sqrt{z^2-4a}}{2}\right)^{1547} + \left(\frac{z-\sqrt{z^2-4a}}{2}\right)^{1547}$$

and $$D_{13492883,b}(z) = \left(\frac{z+\sqrt{z^2-4b}}{2}\right)^{13492883} + \left(\frac{z-\sqrt{z^2-4b}}{2}\right)^{13492883}$$

is its inverse.

Let $$SF(x_1, x_2, x_3)=L_5 \circ \Phi^{-1} \circ D_{13492883,b} \circ \Phi \circ L_4 \circ J_1^{-1} \circ L_3 \circ \Phi^{-1} \circ D_{1547,a} \circ \Phi \circ L_2 \circ J_1 \circ L_1(x_1, x_2, x_3)$$

and $$SF^{-1}(x_1, x_2, x_3)=L_1^{-1} \circ J_1^{-1} \circ L_2 \circ \Phi^{-1} \circ D_{1547,a} \circ \Phi \circ L_3 \circ J_1 \circ L_4^{-1} \circ \Phi^{-1} \circ D_{13492883,b} \circ \Phi \circ L_5^{-1}(x_1, x_2, x_3)$$

Because SF is bijective, we can use SF for various encryption purposes.

All the objects here are kept secret for the symmetric cryptographic communication process.

Figure 3:
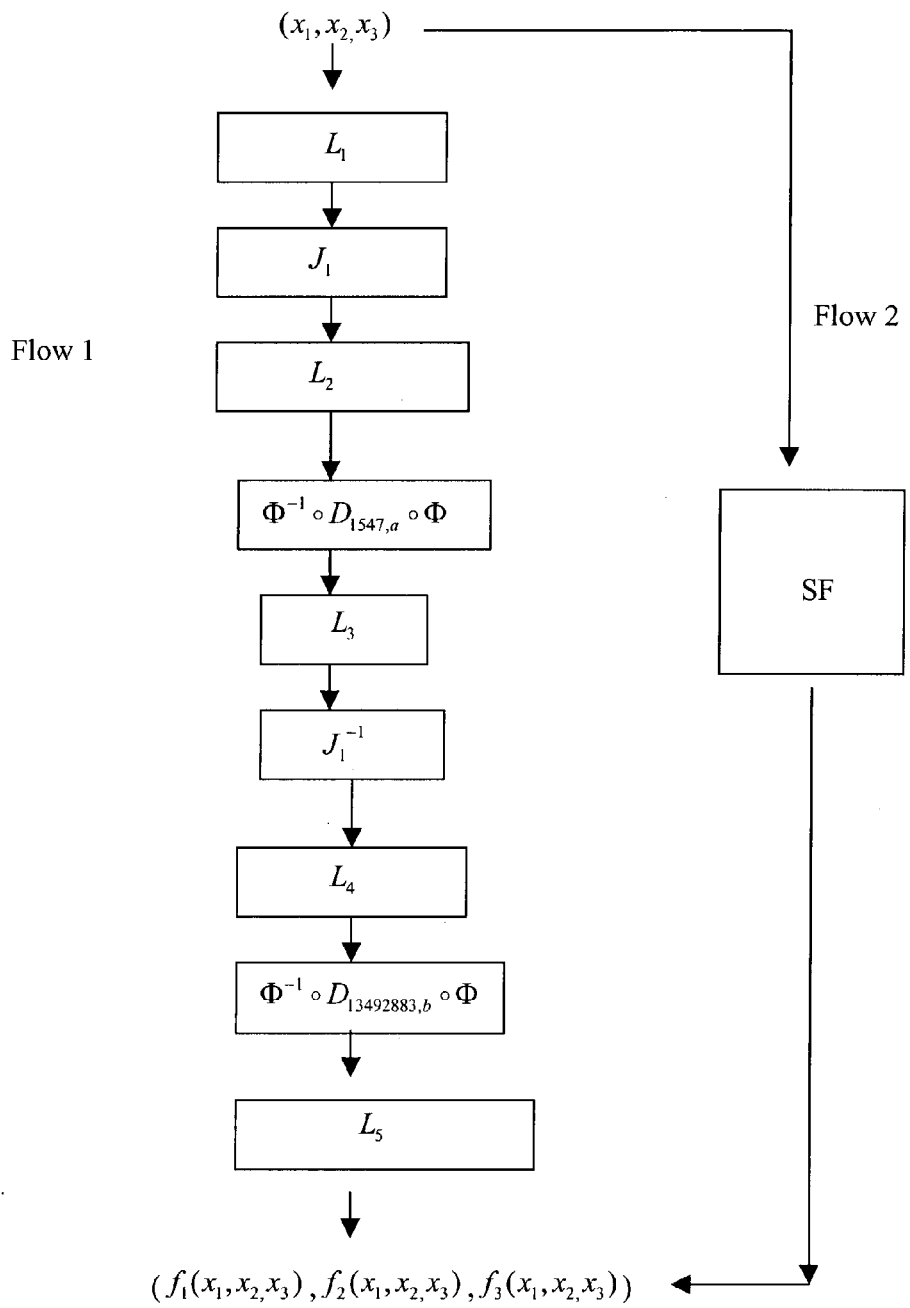
FIG. 3 is a flow diagram of an illustrative enciphering procedure for the enciphered output of the smart card in FIG. 1.

The enciphering procedure is visually described as in FIG. 3, the operations runs from top to bottom and the two flows are equivalent. In the case of first flow, $L_1$ first, then $J_1$ and finally $L_5$. However, the second flow is never used because the size of SF due to its high degree. In this case, the first flow is kept secret. Moreover, deciphering is possible due to fact that we can easily invert the first flow by inverting maps in the first flow.

The novel features of this cipher is that
1) if we expand SF or $SF^{-1}$ in terms of the variable $x_i$, it is size is at least $3^{120}$ bits, for which with all the computer in the word, we will not be able to store it. This makes it impossible to guess it and the only way to find it is to know all the secret objects, in particular the composition factors;
2) each composition factors are chosen to be easy to store and easy to compute;
3) the combination of various kinds of maps, which makes it impossible to use any kind of structure to attack.

The variants of the invention.

There are many kinds of variants of the invention, the major ones are:
1) It can use different kind of maps, which can be easily stored and computed.
2) There are a big variety of maps including all the maps defined in this invention. We can also use the small variable method to define other maps. For the case of the De Jonquieres maps, there are many method to implement high degree and efficient maps, in particular, the sparse polynomials and composition of polynomials, which is used in the construction of $J_1$.

Also we can also use similar non bijective maps for authentication and signature. In this case, the variants includes sparse polynomials and composition of polynomials.

We can also use rational maps like Reidei maps.
1) Given a set of secret objects, we can permute the composition order to create different ciphers, which can be public announced without any security breach.
2) We use compose using more or fewer factors, but we require that at least 1 high degree nonlinear factors and two linear maps.
3) We can also choose different fields, different extension.

The advantages of this system are
1) it is easy to implement and can have very short bits like 24, therefore it is especially applicable for smart card type of applications and identification systems.
2) It is very flexible in the sense we can always change the composition order to use more or fewer factors.
3) the security is unbeatable due to the design of the system, which is attribute to the fact that we know very little about decomposition maps (we now a little about one variable case, but it is not applicable here, because it is for decomposition on polynomial rings) in particular the challenge posed by the famous Jacobian conjecture.

This kind of cipher can be used for all kinds of security purpose including authentication, date storage, etc.

Example of authentication algorithm for credit card transaction.

In this case, we assume that Party A is a credit company, Party B a consumer and Party C a merchant.

Both Party A and Party B have the same secret objects:
1) a field K is chosen as $F_{251}$, Let $\check{K}$ be a degree three extension of K and $\Phi$ is the invertible map from $K^3$ to $\check{K}$.
2) a polynomial $\Pi(x, y, z)=8+3z+7xz+8y+151(x+2y)^2$ is a randomly chosen polynomial that can be calculated easily. The procedure is that for any given two 24 bits numbers, we first calculate $\Pi(x, y)$, pick the first 24 bits of the $\Pi(x, y)$, divide it into 3 numbers of 8 bits and modular each of then by 251, which produces a vector $(x_1, x_2, x_3)$ in $K^3$.
3) $J_1(x_1, x_2, x_3)=(x_1, J_2(x_1, x_2), J_3(x_1, x_2, x_3))=(x_1, x_2+9x_1^{35}+43x_1^{113}, x_3+11J_2(x_1, x_2)^{157}+89x_1^{54}x_2^{127})$,
4) randomly chose affine invertible linear maps $L_1, \ldots, L_4$ and $D_{111,a}(X)$ on $\check{K}$, a randomly chosen Dickson polynomial and $SF(x_1, x_2, x_3)=L_4 \circ J_1^{-1} \circ L_3 \circ \Phi^{-1} \circ D_{111,a} \circ \Phi \circ L_2 \circ J_1 \circ L_1(x_1, x_2, x_3)$ Part A also issues Party B an ID number $\Gamma$ and a smart card that store all the objects and a small program and a chip to be able to perform the calculations for the maps and procedure above.

Note that SF is stored not in the expanded form but rather in the composition form.

Party A also issues Part C an ID number $\ddot{\Gamma}$ and a random number generator $\psi(t)$ producing every minute a number of 24 bits depending on the time t, which Party has a copy as well.

It will be appreciated that this initial setting can all be done through an asymmetric system if both Party B and Party C have their secure open key system like what is described above.

The transaction steps:
1) Assume at time t, Party B buys v dollars of goods from Party C. Party C gives Party B the two numbers $\psi(t)$ and v and $\ddot{\Gamma}$.
2) Party B calculates $\Pi(\psi(t),v,\ddot{\Gamma})$, picks the first 24 bits of the $\Pi(\psi(t),v,\ddot{\Gamma})$, divide it into 3 numbers of 8 bits and modular each of then by 251, which produces a vector (a, b, c) in $K^3$. Then Party B calculates Q=SF(a,b,c). Then Party B gives Party C the two numbers Q and $\Gamma$.
1) Party C sends $\ddot{\Gamma}$, $\psi(t)$, t, y, $\Gamma$, Q to Party A.
1) Party A first check if the $\psi(t)$ matches, if so, then follow the same procedure (secret keys) as Party B does to compute a number $\bar{Q}$ and check if it is the same as Q, if yes, accepts the charge, otherwise rejects it.

The advantages of this system includes:
1) short bits for the authentication number Q;
2) very fast calculations due to all the function can be compute using fast algorithm, for example the powers, and the Dickson polynomials
3) ensures not just authentication of the customer, but also the total charge and the merchant
4) high security due to the fact the number even if someone intercepts all the transmissions, the information cannot be used again, because the authentication changes every time Variants.

There are many different variants of the system:
1) use different field K and implement fast algorithm on K;
2) the second part of the secret objects of Party A and Party B can be replaced by hash functions and many other functions that can be easily calculated but with the properties suitable for our purpose, for example, should not just choose it to x itself, then the authentication of the charge y is lost;
3) the random number generator can also be replaced by other procedure that serves the same purpose that it gives a number not controlled by the merchant, for example, we can have a system that Party A regularly sends Party C the number every minute or so through Internet and other similar procedures;
4) the computation done by Party B can be improved by implementing fast algorithms, or use other kinds of maps or different number of composition factors;
5) the transaction can be used for any kind of remote access transactions and the security cannot breached due to the only one time usability of the transmitted information.

This system can also be directly (or modified to be) used for other kinds of security purpose, like ID systems, banking system, financial transactions and many others.

While the present invention has been illustrated by description of several embodiments and while the illustrative embodiments have been described in considerable detail, it is not the intention of the applicant to restrict or in any way limit the scope of the appended claims to such detail. Additional advantages and modifications may readily appear to those skilled in the art.

What is claimed is:

1. A method of secure asymmetric digital communication, comprising:
   establishing a correspondence through a selectively low degree polynomial map, having characterizing coefficients, between a first vector (X) represented by n elements of a finite field (K) and a second vector (Y) represented by m elements of this finite field (K);
   selecting two affine linear maps;
   selecting a nonlinear embedded inseparable small variable map having at least one hidden equation;
   selecting a nonlinear embedded generalized de Jonquieres map;
   selecting a nonlinear de Jonquieres map; and encrypting a digital message as a composition of a selected one of the affine linear maps, the three nonlinear maps, and the other affine linear map.

2. The method of claim 1, further comprising adding a linear embedding map to the composition prior to the selected one of the affine linear maps for eliminating antecedents during decryption.

3. The method of claim 1, further comprising using hash functions for eliminating antecedents during decryption.

4. The method of claim 1, further comprising inserting redundancy into the digital message for eliminating antecedents during decryption.

5. The method of a simplified claim 1, by using only one nonlinear embedded inseparable small variable map having at least one hidden equation and two affine linear maps, and (or) further comprising a projection map, which is particularly applicable for open key authentication.

* * * * *